J. M. JOHNSON.

COIN AND TICKET FAPE REGISTER.

APPLICATION FILED FEB. 7, 1920.

Reissued June 14, 1921.

15,123.

11 SHEETS—SHEET 1.

Witnesses

H. G. Parks

Charles W. Hills Jr.

Inventor

Jay M. Johnson by Charles W. Hills

Atty.

J. M. JOHNSON.

COIN AND TICKET FARE REGISTER.

APPLICATION FILED FEB. 7, 1920.

Reissued June 14, 1921.

15,123.

11 SHEETS—SHEET 2.

Witnesses

H. G. Weeks

Charles W. Helsop.

Inventor

Jay M. Johnson by Charles W. Helsop

Atty.

J. M. JOHNSON.

COIN AND TICKET FARE REGISTER.

APPLICATION FILED FEB. 7, 1920.

Reissued June 14, 1921. 15,123.

11 SHEETS—SHEET 3.

Witnesses

H. G. Sicks

Charles W. Gillespie.

Inventor

Jay M. Johnson by Charles W. Gillespie Atty.

J. M. JOHNSON.

COIN AND TICKET FARE REGISTER

APPLICATION FILED FEB. 7, 1920.

Reissued June 14, 1921. 15,123.

11 SHEETS—SHEET 4.

Witnesses

H. G. Marks

Charles W. Hills, Jr.

by

Inventor

Jay M. Johnson

Charles W. Ricus

Atty.

J. M. JOHNSON.

COIN AND TICKET FARE REGISTER.

APPLICATION FILED FEB. 7, 1920.

Reissued June 14, 1921. 15,123.

11 SHEETS—SHEET 5.

Witnesses

H. G. Parks

Charles W. Hills Jr.

Inventor

Jay M. Johnson by Charles W. Hills

Atty.

J. M. JOHNSON.

COIN AND TICKET FARE REGISTER.

APPLICATION FILED FEB. 7, 1920.

Reissued June 14, 1921.

15,123.

11 SHEETS—SHEET 6.

Witnesses

H. G. Rinks

Charles W. Helsop.

Inventor

Jay M. Johnson

Charles W. Helsop

Atty.

J. M. JOHNSON.

COIN AND TICKET FARE REGISTER.

APPLICATION FILED FEB. 7, 1920.

Reissued June 14, 1921. 15,123.

11 SHEETS—SHEET 7.

Witnesses

H. G. Dicks

Charles W. Helsop by

Inventor

Jay M. Johnson

Charles W. Helsop

Atty.

J. M. JOHNSON.

COIN AND TICKET FARE REGISTER.

APPLICATION FILED FEB. 7, 1920.

Reissued June 14, 1921.

15,123.

11 SHEETS—SHEET 8.

Witnesses

H. G. Fiske

Charles W. Gilson

Inventor

Jay M. Johnson

Charles W. Gilson

By

Atty.

J. M. JOHNSON.

COIN AND TICKET FARE REGISTER.

APPLICATION FILED FEB. 7, 1920.

Reissued June 14, 1921. 15,123.

11 SHEETS—SHEET 9.

Witnesses

H. G. Sinks

Charles W. Hills jr.

Inventor

Jay M. Johnson by Charles W. Hills

Atty.

J. M. JOHNSON.

COIN AND TICKET FARE REGISTER.

APPLICATION FILED FEB. 7, 1920.

Reissued June 14, 1921. 15,123.

11 SHEETS—SHEET 10.

Witnesses

H. G. Dinks

Charles W. Hills

Inventor

Jay M. Johnson

Charles W. Hills

Atty.

J. M. JOHNSON.

COIN AND TICKET FARE REGISTER.

APPLICATION FILED FEB. 7, 1920.

Reissued June 14, 1921. 15,123.

11 SHEETS—SHEET 11.

Witnesses

H. G. Rinks

Charles W. Hills Jr.

Inventor

Jay M. Johnson by Charles W. Hills

Atty.

UNITED STATES PATENT OFFICE.

JAY M. JOHNSON, OF CHICAGO, ILLINOIS, ASSIGNOR, BY MESNE ASSIGNMENTS, TO JOHNSON FARE BOX COMPANY, OF CHICAGO, ILLINOIS, A CORPORATION OF NEW YORK.

COIN AND TICKET FARE REGISTER.

15,123. Specification of Reissued Letters Patent. Reissued June 14, 1921.

Original No. 1,310,833, dated July 22, 1919, Serial No. 872,919, filed November 19, 1914. Application for reissue filed February 7, 1920. Serial No. 357,018.

*To all whom it may concern:*

Be it known that I, JAY M. JOHNSON, a citizen of the United States, and a resident of the city of Chicago, in the county of Cook and State of Illinois, have invented certain new and useful Improvements in Coin and Ticket Fare Registers; and I do hereby declare that the following is a full, clear, and exact description of the same, reference being had to the accompanying drawings, and to the numerals of reference marked thereon, which form a part of this specification.

This invention relates to that class of devices principally designed for use on street car and interurban systems, although well adapted for use in many other instances where the collection and counting of coins or tickets is necessary.

It is an object of the present invention to construct a fare receiving and coin counting machine embodying mechanisms adapted to count a mixture of coins of different denominations, and as well, provided with mechanism which registers a ticket or transfer inserted into the machine, totaling the same with the coin fares collected upon one register without affecting the count registered upon another register for the coins only.

It is an object of this invention to construct a machine wherein coins are selectively picked up from an indiscriminate mixture of different denominations, each coin registered, and then passed to a place of deposit, all of the operations being automatically controlled by the mechanisms within the machine, the operator merely turning the crank thereof.

It is also an object of this invention to construct a device provided with mechanisms for counting coins, the registering mechanisms being entrained with the driving means of the machine by the coin itself, and held in train independently of the coin until the coin has been registered, said registering mechanism acting to totalize the collection of coins of different denominations without any adjustment of the machine on the part of the operator.

It is also an object of this invention to construct a device for counting and registering coins of different denominations, the entrainment of the proper registering mechanism for the different coins being governed entirely by the coin itself, the means for the purpose being actuated the proper amount by contact with the coin itself, the different sizes of the coins of different denominations insuring a selective entrainment of the proper registering mechanism with the drive of the machine to register the coins.

It is also an object of this invention to construct a machine adapted to receive and mutilate tickets or transfers, totalizing the collection of the tickets upon a mechanism which also registers the number of coin fares collected.

It is also an important object of this invention to construct a device wherein the pressing of a small lever prior to turning the crank of the machine will cause mechanisms to be entrained upon actuation of the crank to register a ticket or transfer and without entraining the register which counts the coins.

It is also an object of this invention to construct a device employing means for moving coins received in a hopper to counting position in a manner insuring counting of the coins one at a time to prevent errors in counting.

It is also an object of this invention to construct a coin and ticket collecting machine wherein independent means are provided for counting the total amount of the different coins received, together with mechanisms adapted to totalize the number of fares received both in coins and tickets or transfers.

It is also an object of this invention to construct a coin counting and ticket registering machine wherein suitable safety mechanisms are provided to guard against attempts to defraud the machine, either by cranking the same at excessive speed or attempting to operate the same in any abnormal manner.

It is furthermore an important object of this invention to construct a coin counting and fare registering machine in which the total amount of the coins counted, as well as the total fares collected, both in coins and tickets or transfers, are displayed at convenient points upon the machine for observation.

It is finally an object of this invention to construct a compact machine easy to operate and not liable to get out of order, the different mechanisms of which are so constructed as to frustrate any attempt to improperly register a coin or ticket.

The invention (in a preferred form) is illustrated in the drawings and hereinafter more fully described.

Figure 1:
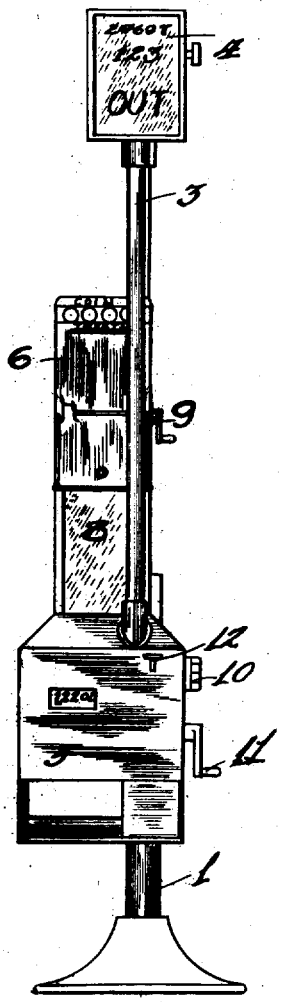
Figure 1 is a front elevation of a completely assembled device embodying the principles of my invention.
Figure 2:
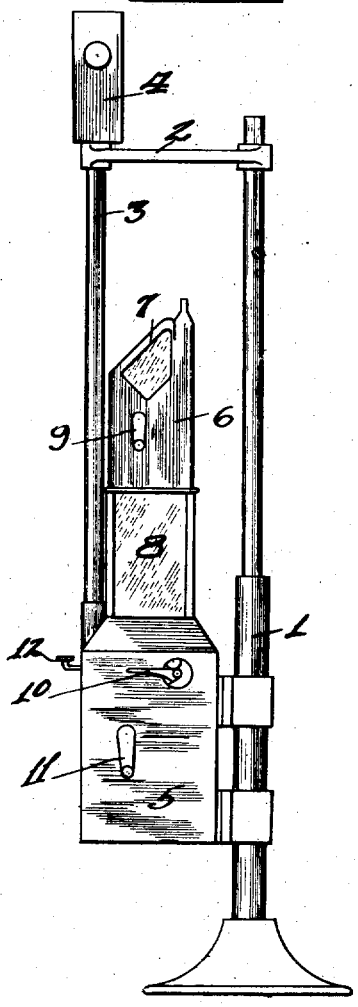
Fig. 2 is a side elevation thereof.

The device as arranged for use is mounted upon a standard 1, which, at its upper end, is provided with a bracket arm 2, supporting a tubular extension 3, on the upper end of which is a passenger register 4, conveniently disposed for observation by the passengers of a car. Supported on the lower portion of said standard is a fare or coin register 5, and built upon the upper end thereof is a coin and ticket collection box 6, the tickets inserted into the machine falling into a compartment 7 where they may be viewed through glass walls and the coins falling upon a dumping floor where they may be viewed, through any of the four sides of a glass compartment 8. A crank 9 is provided upon the collection box 6, which serves to actuate mechanism to receive and mutilate tickets from the collection compartment 7, and another crank 10, is provided upon the coin register box 5, to actuate the dump to allow the coins to pass from the compartment 8, into the coin register. A crank 11, on the exterior of the coin register box 5, is provided for the purpose of actuating the coin counting mechanism within, and a small push lever 12, is mounted on the outside of said coin register box 5, which acts to shift mechanism for causing the registration of a ticket on the mechanisms of the passenger register 4, when so desired.

Mounted within the coin register box 5, is a frame upon which is supported the coin counting and registering mechanism, said frame consisting of two triangular vertically disposed plates 13 and 14, which, on their inclined edges, have attached thereto and support an inclined plate 15. Another plate 16, which may be termed a back plate, is secured in vertical position along the vertical edges of said triangular plates 13 and 14, and at its ends said back plate is flanged over, as denoted by the reference numeral 17, to permit ready attachment thereof to said triangular frame plates.

Figure 8:
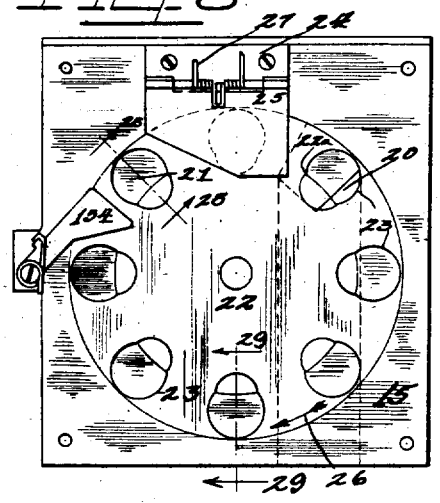
Fig. 8 is a small front face view of the mechanism shown in Fig. 7, but with the coin hopper removed.
Figure 28:
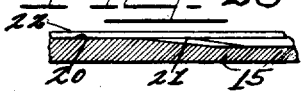
Fig. 28 is a section taken on line 28—28 of Fig. 8.
Figure 29:
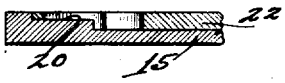
Fig. 29 is a section taken on line 29—29 of Fig. 8.

A hopper 18, to receive the coins, and provided with an aperture 19, through which the coins fall in passing into the hopper, is mounted on the inclined plate 15. The upper surface of said inclined plate 15, is recessed different amounts to afford a step 20, extending peripherally therearound almost for the entire circumference, but terminating at the upper portion of the plate in an inclined portion 21, as clearly shown in Figs. 8 and 28. A flat circular coin carrying disk or wheel 22, is mounted upon said inclined plate 15, fitting into the recessed portion thereof, so that the top surface of the disk or wheel is flush with the top surface of said plate 15. Said coin carrying wheel 22, is provided with a plurality of apertures or pockets 23, the shape of which being such as to permit said pockets to carry coins of various denominations, in particular a nickel, penny, dime, and Canadian five-cent piece.

A plate 24, is screwed upon the surface of the plate 17, at the upper end thereof, and hingedly connected to said plate 24 is a stripper or presser plate 25, which is provided with an inclined edge directed opposite to the direction of rotation of the coin carrying disk, the latter of which rotates in the direction indicated by the arrow 26. A small spring 27 is attached at the hinged connection between said respective plates 24 and 25, in order to normally impel said presser plate 25, downwardly upon the disk 22. Beneath said presser plate 25, said plate 15, is recessed, and pivotally mounted therein is a cam or lever 28 provided with an integral gudgeon or pivot shaft 29, which extends through said plate 15, and near its end is journaled in a bracket arm 30, secured upon the rear surface of said plate 15. A small spiral spring 31, is wound about the shaft 29, and connected thereon and to the plate 15, to normally impel said lever 28, downwardly in a position to contact the periphery of coins carried in the coin pockets 23, of the disk as said coins are slidably moved over the plate 15. For the purpose of supporting said coin carrying wheel 22, on said plate 15, the rear surface of said plate 15 has formed integral therewith a boss 32, which serves as a bearing for a shaft 33, extending therethrough and secured to said coin carrying disk.

A worm gear 34, is secured upon the inner end of said shaft 33, and receives the drive from a worm 35, secured upon a main driving shaft 36, which, at its ends, is journaled in the respective triangular frame plates 13 and 14, and mounted on one end thereof is the actuating crank 11.

A spring clutch connection is provided between the crank 11, and the shaft 36, in order to cause a release therebetween in the event of jamming of any of the parts, and for this purpose a clutch member 37, is slidably mounted upon said shaft 36, and is caused to rotate therewith by a pin 38, secured in the shaft and projecting through a slot in said clutch member. A compression spring 39, is wound about said shaft 36, and bears at one of its ends against the end of the worm 35, and at its other end against said slidable clutch member 37, to normally impel the same into engagement with a complemental clutch member 40, which is rotatable upon the shaft 36, and is connected to said crank 11, by means of a pin 41.

After the coins which have been carried upwardly by the coin wheel 22, have passed beneath the lever 28, which serves to entrain registering mechanism in a manner hereinafter described, the coins are moved farther along until they pass over an aperture $22^a$, in said plate 15, through which the coins fall into a chute $22^b$, secured upon the rear surface of said plate 15, which directs the coins into a suitable collection compartment. A coin registering mechanism is mounted upon the vertical back plate 16, the various parts thereof being supported in position by parallel frame plates 42, 43, 44, and 45, rigidly held perpendicular to said vertical plate 16, upon a base plate $42^a$, and all connected together by means of a bolt 46. A driving shaft 47, is journaled in said respective plates 42, 43, 44, and 45, at the lower end thereof, and at one of its ends, is provided with a gear 48, meshing with a gear 49, secured upon the main driving shaft 36, of the register.

Figure 16:
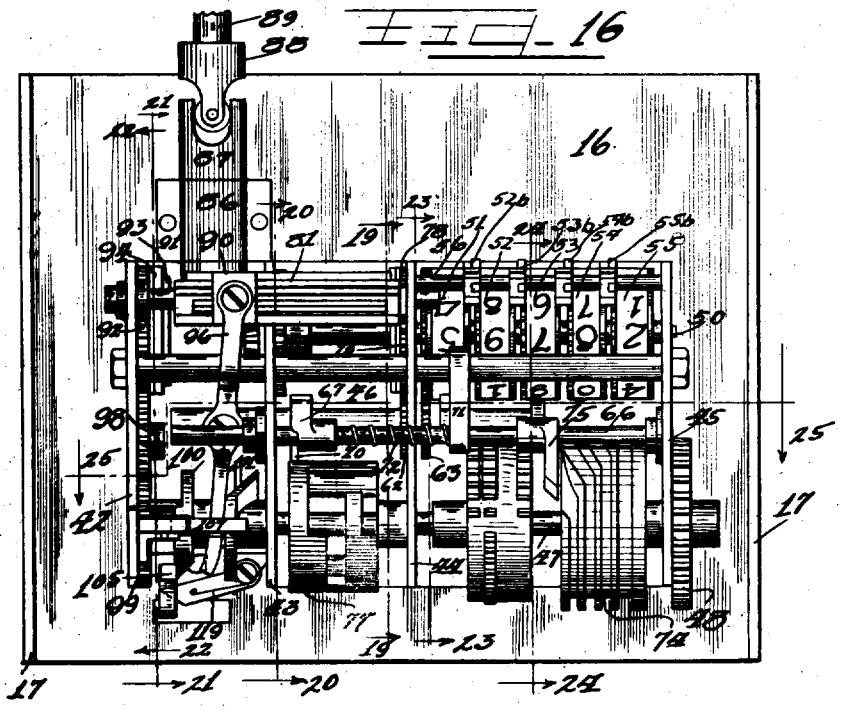
Fig. 16 is a view of the opposite side of the plate shown in Fig. 15, illustrating the counting mechanism in elevation.
Figure 17:
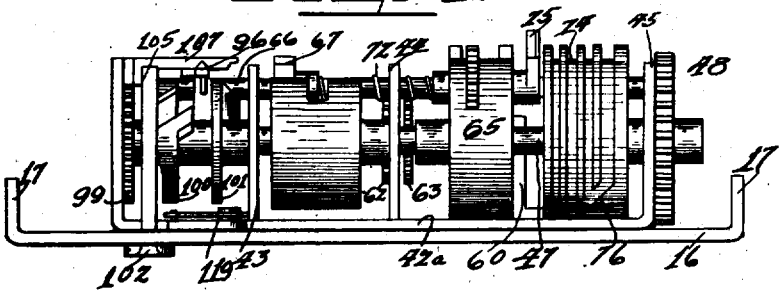
Fig. 17 is a bottom plan view of the mechanism shown in Fig. 16.

Another shaft 50, is mounted parallel to said shaft 47, being journaled in the upper portion of said respective plates 43, 44, and 45, and rotatably mounted upon said shaft 50, are register wheels 51, 52, 53, 54, and 55, respectively. As is usual in registering mechanisms, each of the register wheels is provided with a toothed gear on one side thereof, as denoted by the reference characters $51^a$, $52^a$, $53^a$, $54^a$, and $55^a$, respectively. Mounted between said plates 44 and 45, is a small shaft 56, adjacent said register wheels, and journaled thereon are a plurality of small pinions denoted respectively by the reference characters $52^b$, $53^b$, $54^b$, and $55^b$, the teeth of which mesh with the respective gears $52^a$, $53^a$, $54^a$, and $55^a$, of the register wheels. As clearly shown in Fig. 16, adjacent teeth of said pinion on the shaft 56, are of different length, and the short teeth are adapted to be contacted by a single tooth cut in an adjacent gear wheel, so that with each complete revolution of one gear wheel said small pinion is actuated a distance of two teeth, thus transmitting a movement of one division to the adjacent gear wheel through its respective gear. This construction is well known and usual in all registers, so that further details of construction or operation are unnecessary.

Figure 15:
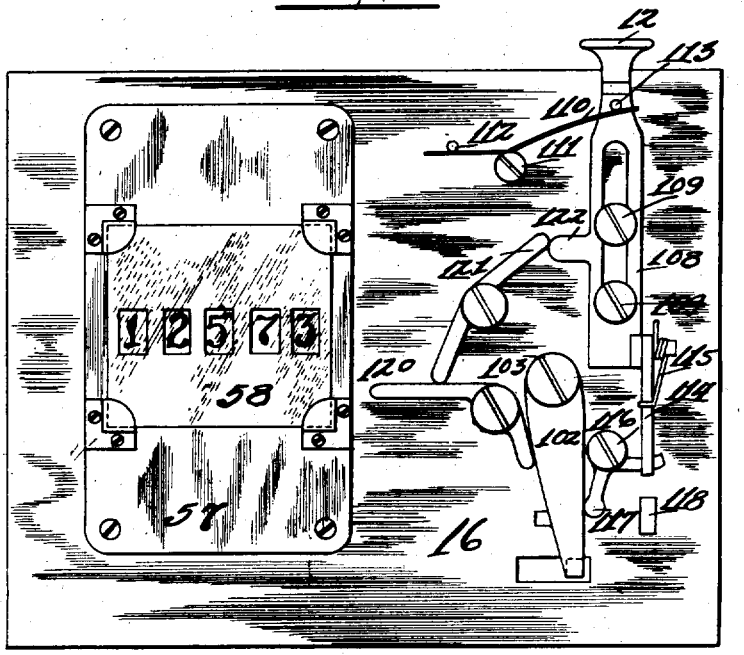
Fig. 15 is a face view of the rear plate of the coin counting mechanism taken on line 15—15 of Fig. 5.

Said base plate 42[a], and back plate 16, are each cut away to permit said register wheels to project a slight amount therethrough in order to display the numerals on the register wheels, as clearly shown in Fig. 15. Accordingly a plate 57, is secured on the opposite surface of said plate 16, and holds supported over the apertures cut in said plate a glass plate 58, through which the numbers on the register wheels may be plainly seen.

Mechanism is provided for transferring the movement of the continuously driven shaft 47, to the register wheels when the coin passes through the machine to effect the proper registration of the coin according to its particular denomination. For this purpose a small slidable shaft 59, is journaled near one of its ends in the plate 43, and at its other end in a bracket 60, mounted upon the base plate 42[a], the plate 44, being cut away to permit insertion of said slidable shaft 59, into position. Said shaft 59, is provided with a squared portion 61, and feathered thereon are a pair of integrally connected pinions 62 and 63, respectively, the one on one side of the plate 44, and the other on the other side thereof, so that said shaft is permitted to slide and yet the pinions 62 and 63, the latter of which meshes with the gear 51[a], of the register wheel 51, are held from movement by the plate 44, and constrained to rotate with said shaft. Said shaft 59, receives the drive from the shaft 47, due to the engagement of a pinion 64, keyed on said shaft 59, with one of the sets of teeth on a mutilated gear 65, secured on said shaft 47, said gear consisting of a cylinder with rows of teeth of various numbers thereon, the number depending upon the denomination of coin to be counted. For instance, the first row of teeth are for the registration of nickels and embraces five teeth; the next row is for dimes and embraces ten teeth; the next row is for pennies and has but one tooth, and the last row is for a Canadian five cent piece, which is a coin smaller than a dime, and, like the first row, embraces five teeth. Accordingly, when the shaft 59, is shifted said pinion 64, meshes with one of the rows of teeth on the mutilated gear 65, and said shaft 59, is caused to rotate the requisite amount. Of course, such rotation of the shaft 59, is transmitted to the register wheels, due to the engagement of the gear 63, and the gear 51[a].

For the purpose of shifting said shaft 59, a slide rod 66, is mounted between the respective plates 43 and 45, the plate 44, being cut away, and secured upon said rod to move therewith is a small bracket or contact piece 67, which, on its under side, is provided with a tail 68, engaging between a collar 69, and a star wheel 70, both secured on said slidable shaft 59. A small bracket arm 71, is rigidly secured upon the bolt 46, and projects into a position to receive said rod 66, slidably therethrough. A spiral compression spring 72, is wound about said rod 66, and at one end bears against the contact piece 67, and at its other end bears against said bracket arm 71, so that movement of said rod in one direction is resisted by said spring. Said rod 66, is moved at times when coins on the carrying wheel pass beneath the lever 28, due to the movement of a curved arm 73, which bears against said contact piece 67, and which is secured upon the pivot shaft 29, of said lever 28. Thus movement of said lever is transmitted to said curved arm 73, and thence to the contact piece 67, causing movement of the slidable rod 66. Of course when the slidable rod 66 is moved, the shaft 59 is moved therewith, due to the engagement of the tail piece 68, between the star wheel 70, and collar 69 on said shaft. Inasmuch as the movement transmitted to the rod from the lever on the coin disk is only momentary, it is necessary that mechanisms be provided to maintain the pinion 64, in train with one of the respective rows of teeth on the mutilated gear until the amount of the particular coin has been registered. For this purpose a cylindrical cam 74, is rigidly secured upon the shaft 47, having a plurality of grooves or tracks therein, four in number, corresponding in length measured in degrees to the length of the respective rows of teeth on said mutilated gear 65. As shown clearly in Fig. 18, an inclined guide-way is provided at the entrance end of each of the grooves on said cam, so that a finger 75, rigid upon said slidable rod 66, when moved over at the proper interval, engages in front of the inclined surfaces of the rotating cam 74, and, due to the inclination of said surfaces, is caused to move inwardly until engaged in the proper circumferential groove. Of course the rod 66, is thereby held over in position until the cam has rotated a certain amount, and the pinion 64 has been driven by one of the rows of teeth on the mutilated gear 65 and after completion of the registration of the coin said finger is thrown out by contact with an inclined wall 76 on said cam which is clearly shown in the development of the cam in Fig. 26, and the shaft 59, and slide rod 66, then return to normal position under the impulse of the spring 72.

Means are also provided for preventing rotation of said cam 69, to effect registration of a coin except when the shaft has been shifted to cause engagement of the pinion 64, with the proper row of teeth on said gear 65, and also to prevent further or excess rotation of said shaft 59, after the same has been rotated the requisite amount by one of the respective rows of teeth on the gear 65.

Figure 20:
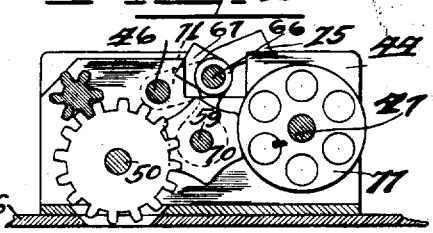
Fig. 20 is a section taken on line 20—20 of Fig. 16.
Figure 18:
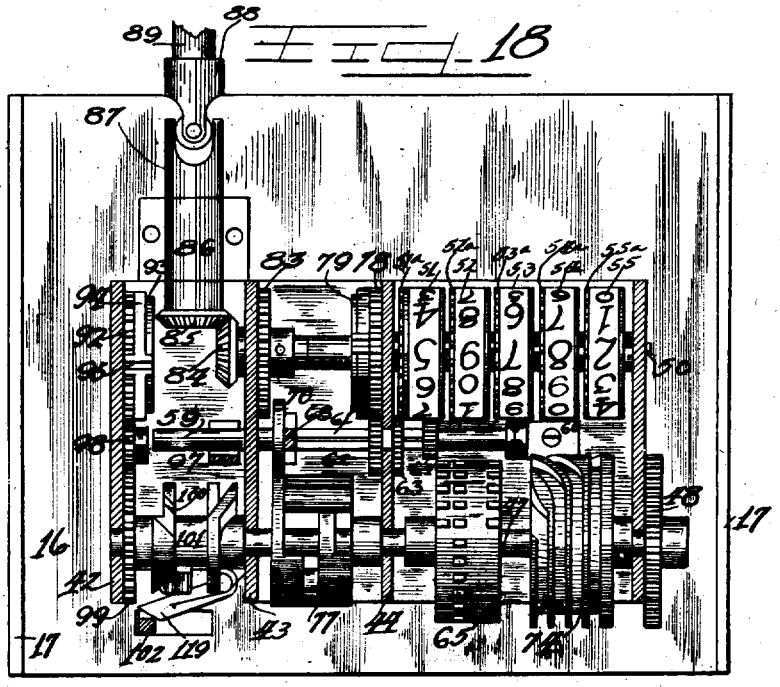
Fig. 18 is a view similar to Fig. 16, but with parts omitted and parts shown in section.
Figure 23:
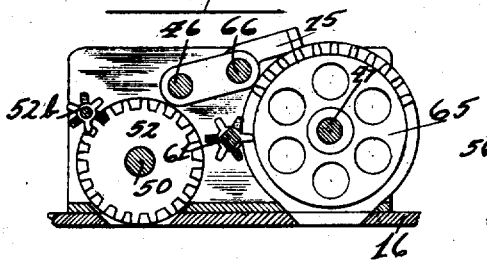
Fig. 23 is a section taken on line 23—23 of Fig. 16.
Figure 24:
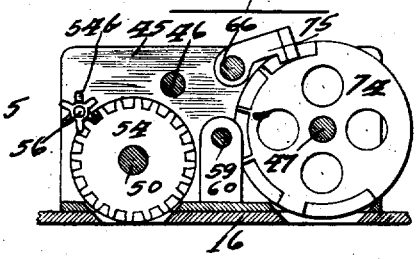
Fig. 24 is a section taken on line 24—24 of Fig. 16.
Figure 26:
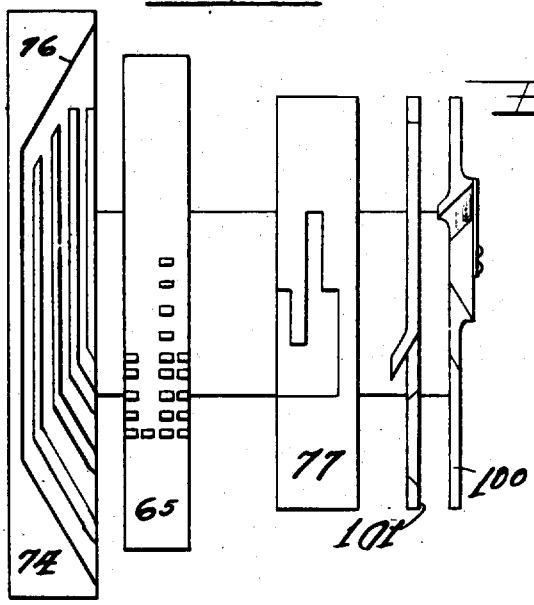
Fig. 26 is a view showing the development of certain of the various members illustrated in Fig. 25.
Figure 27:
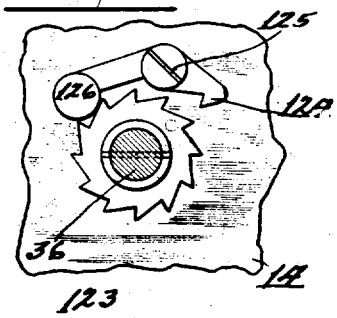
Fig. 27 is an enlarged detail showing the mechanism on the driving shaft of the fare register to prevent excessive speed of rotation thereof.
Figure 25:
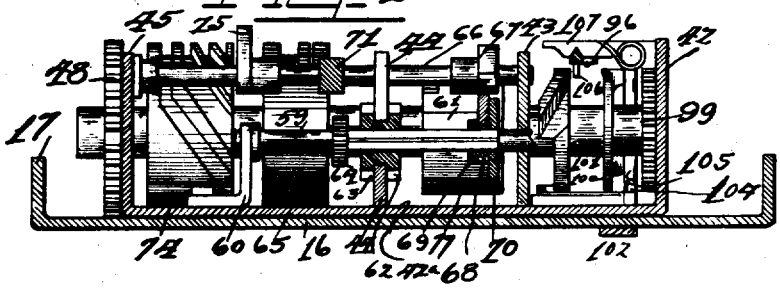
Fig. 25 is a section taken on line 25—25 of Fig. 16.

For this purpose a cylindrical member 77, is secured upon said shaft 47, and at portions in the periphery thereof said member is cut away, as clearly shown in Fig. 18, and Fig. 26, the cut away portion being of a length measured in degrees substantially equal to that of the respective rows of teeth on the mutilated gear 65, and the grooves on the cam 64. Accordingly when the shaft 59, has been shifted so that the pinion 64 thereon is in engagement with the mutilated gear, the star wheel 70 is also shifted so as to be permitted to rotate, the teeth thereof swinging through one of the respective cut-away portions on said cylinder 77. It is obvious that when one of the cut-away portions on said cylinder is not in the path of the star wheel 70, that said star wheel cannot rotate, the teeth thereof contacting the peripheral walls of the cylinder. Said cylinder 77, is provided with a number of longitudinally disposed apertures therethrough, as clearly shown in Fig. 20, but this is merely for the purpose of securing lightness.

In order to transfer the movement of the registering mechanisms to the fare box 4, to show that one or more fares, as the case may be, have been received, a gear 78, is journaled upon said shaft 50, and at all times meshes with the gear 62, which is feathered upon the squared portion 61, of the shaft 59. Consequently, when any one of the register wheels is driven, said gear 78, is likewise rotated.

Figure 19:
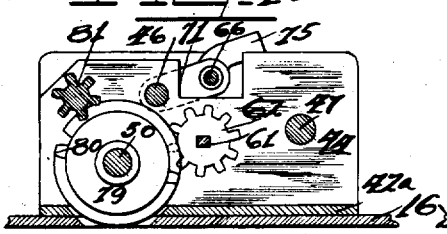
Fig. 19 is a section taken on line 19—19 of Fig. 16.

Rigidly secured to said gear 78, is a mutilated gear 79, having only two teeth, as clearly shown in Fig. 19, and said teeth being disposed diametrically opposite one another and adjacent notches 80, cut in the integral disk portion of said gear between said gear 79, and the gear 78. Slidably mounted between the plates 42 and 44, the plate 43, being cut away, is an elongated gear 81, integral with its shaft, every other tooth at one end of which is foreshortened in width to permit one end of the teeth to engage in the notches 80, of the mutilated gear 79, and the ends of the shorter teeth to be engaged by one of the two teeth of said mutilated gear. Consequently as said gear 78, rotates, the gear 79, rotating therewith, when a notch 80, and a tooth on the mutilated gear engage the elongated gear 81, said gear is caused to rotate a distance of two teeth. It is obvious that said long gear 81, cannot rotate, except at such times as when a notch 80, is in registering position to receive one of the teeth thereof. The hub of said mutilated gear 79, extends outwardly upon the shaft 50, for quite a distance and abuts against a sleeve 82, which is journaled on the shaft 50, and in the plate 43. Rigidly secured upon said sleeve 82, on one side of said plate 43, is a large gear 83, and on the opposite side of said plate is a bevel pinion 84, so that said gear and pinion are constrained to rotate together at all times. Said long gear 81, is of a length to mesh both with said mutilated gear 79, and also with the gear 83, so that whenever said register wheels are actuated, the drive is also transmitted through said long gear to the gear 83, and thence to the bevel pinion 84. Meshing with said bevel pinion 84 is another bevel pinion 85, which is secured upon the end of a shaft extending through the vertical bearing member 86, the upper end of said short shaft having secured thereon one member 87 of a universal joint, the other member 88, of which is secured upon a fare box shaft 89, extending upwardly through the tubular standard 3, and into the fare box 4, to drive the mechanisms therein.

When it is desirable to register a ticket or transfer collected, it is essential that the drive for the passenger register shaft be disconnected from the register wheels, and instead, that the drive be obtained from another source, and for this purpose said bevel pinion 84 is caused to be rotated by entrainment with other mechanisms to be rotated. As clearly shown in Fig. 16, a collar 90, is journaled upon said integral shaft of the elongated gear 81, and beyond said collar 90, another integral elongated gear 91, is formed, adjacent teeth of which are of different width, similar to the construction already described with reference to the gear 81. Secured upon a stud shaft in said plate 42, is a gear 92, which has rigidly associated therewith a one tooth mutilated gear 93, having a disk portion 94, integral therewith, and provided at one point in its periphery with a notch 95, which is adjacent to the only tooth on said mutilated gear. A shifting lever 96 is pivotally mounted upon a bracket 97, secured upon said base plate 42[a], and one end of said lever is loosely pivoted to the collar 90, on said elongated gear member to slide the same from one position to another, that is, from a position wherein the respective mutilated gear 79, and the gear 83 are in train, to the position wherein the mutilated gear 93, and said gear 83 are in train. The position of the notch 95, of the mutilated gear 93, is such that an intermeshing engagement of the elongated gear therewith, can only take place when the cam 74 is in position such that the finger 75 cannot engage any one of the grooves thereon, that is, when the fingers 75 is between the entrance and exit ends of the respective grooves on the cam 74. It is readily apparent, therefore, that only a coin or only a transfer can be registered at one time in the fare box as the arrangement and timing of the parts prevents simultaneous entrainment of the respective driving mechanisms therefor. The gear 92 is driven at all times from the shaft 47 by means of a small idler pinion 98 meshing therewith, which in turn is driven by a gear 99, meshing with said idler, and secured on said shaft 47, adjacent the frame plate 42.

For the purpose of automatically shifting the elongated gears 81 and 91 from normal position, that is with the gear 81 entrained with the mutilated pinion 79, and gear 83, into an adjusted position wherein the gear 91 is entrained with the gear 92 cams are provided upon the shaft 47 to cause actuation of the lever 96. There are two such cams on the shaft 47, one the entraining cam and denoted by the reference numeral 100, and the other the disentraining cam denoted by the reference numeral 101.

Figure 21:
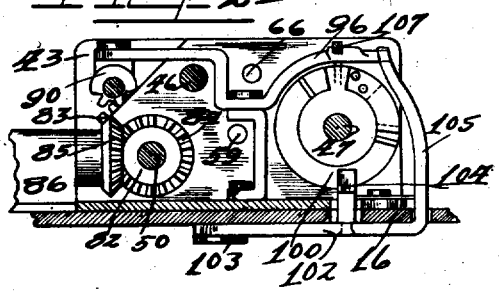
Fig. 21 is a section taken on line 21—21 of Fig. 16.
Figure 22:
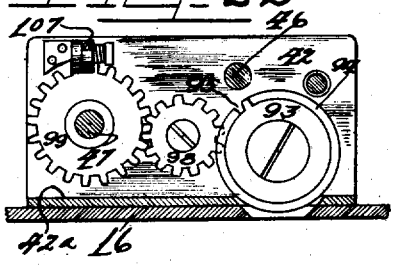
Fig. 22 is a section taken on line 22—22 of Fig. 16.

A lever 102 is pivoted upon a stud 103 on the opposite face of the plate 16 and as clearly shown in Fig. 21 is provided with a projection or tooth 104 which projects through a suitable slot in said plate 16, and base plate 42ª, so that when the lever 102 is slightly moved said tooth is in the path of the cam 100. The lower end of said lever 102 is bent inwardly through a slot in said plate 16 and curves over as indicated by the reference numeral 105 into a position to strike the tail of the lever 96. The outer end or tail of said lever 96 is provided with a depending rigid pin 106 adapted to be engaged by the cam 101, when said lever 96 has been shifted to again shift the lever to throw the elongated gears out of entrainment with the respective gear 83, and mutilated pinion 93. For the purpose of retaining the lever 96 in either one of its shifted positions, a spring actuated notched pawl 107 is mounted on the frame plate 42, and bears downwardly upon an upper knife edged portion of said lever to prevent the same being jarred from one position to another.

In order to slightly adjust said lever 102 initially into a position so that the tooth 104 thereon will be engaged by the entraining cam 100 mechanisms are provided upon the front surface of the plate 16 which consist of a long slotted slide bar 108 integral with or rigidly attached to the finger lever 12 on the exterior of the device, a pair of studs 109 being secured in said plate 16 to hold and guide said slide bar 108 in its various positions of movement. A leaf spring 110 wound about a stud 111, bears at one of its ends against a fixed stop 112, on the back plate 16 and at its other end beneath a stop 113 on said slide bar 108 to resist the downward movement thereof, and to return the same to initial position after each depression. A pawl 114 pivoted on the lower end of said slide bar 108 is adapted to swing perpendicular to the plane of the plate 16, and is normally impelled inwardly toward said plate by a spring 115. Said pawl 114 is provided on its inner edge with a tooth adapted when the pawl is moved downwardly, due to movement of the slide bar 108, to engage one arm 116 of a bell crank, the other arm 117 of which normally lies against the lever 102 and acts when shifted by said pawl to move said lever to one side a slight amount. The pawl 114 is immediately disengaged from the arm 116 as the downward movement progresses due to contact with a fixed lug or cam member 118 on the plate 16, which acts to swing said pawl outwardly against the tension of its spring away from said arm 116.

In order to temporarily retain the lever 102 in its slightly shifted position, due to the movement imposed thereon by the crank 117 a spring impelled pawl 119 is pivoted on the opposite surface of the plate 16 and as clearly shown in Fig. 18 is adapted to be elevated as the lower edge or end of the pawl rides over the lever 103, and then being impelled downwardly again behind said lever, holds the same until the entraining cam 100 engages the tooth 104 to shift said lever 102 and its tail 105 therewith entirely over to its opposite extreme position, the tail 105 striking the lever 96 by such movement and shifting the elongated gears 81 and 91 respectively into engagement with those gears causing actuation of the fare box mechanism to register a ticket or transfer.

Referring back to the actuating mechanism on the front surface of the plate 16 means are provided for preventing shifting of the lever 102 except when the slide bar 108 is depressed, and this consists of a bell crank 120 and another bell crank 121, both pivoted on the surface of the plate 16, one arm of the crank 120 bearing against said lever 102, and the other arm thereof contacted by one of the arms of the bell crank 121, and the other lever of said crank 121, normally resting against a projection 122, on said slide bar 108. This arrangement of the parts acts to prevent movement of either bell crank and therefore said lever 102 until the extension 122 has been moved downwardly a sufficient amount to permit the arm of the crank 121, to clear the same.

In order to prevent an excessive speeding up of the mechanisms by rapidly turning the crank 11, a ratchet wheel 123 is pinned upon the main drive shaft 36 adjacent the frame plate 14 and mounted directly thereabove is a pawl 124 pivoted upon a stud 125 in said plate 114. Said pawl is provided with an integral weighted tail extension 126, which normally rests upon the teeth of the ratchet wheel holding the pawl 124 out of engagement therewith, but which is thrown upwardly at high speeds to cause the pawl to engage and lock the ratchet wheel.

Figure 13:
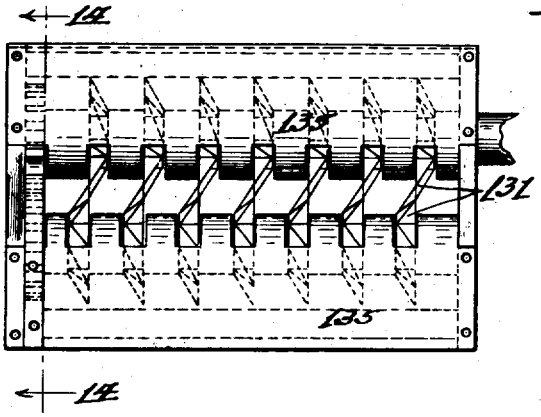
Fig. 13 is a plan view of the mutilating mechanism for tickets, taken on line 13—13 of Fig. 4.
Figure 14:
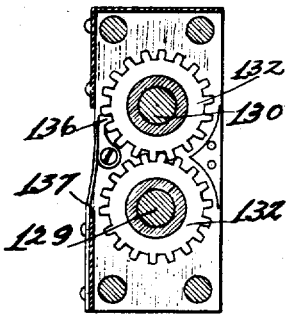
Fig. 14 is a section taken on line 14—14 of Fig. 13.

Within the collection box 6 is the aforementioned compartment 7, the floor of which is formed by two inclined transversely extending partitions 127 and 128 respectively, which at their lower ends are slightly separated to permit a ticket to pass therethrough. Mounted directly beneath the opening between said partition members are a pair of shafts 129 and 130, on the latter of which is rigidly attached the handle 9. Secured on both of said shafts are sets of similarly constructed sharp toothed spur wheels 131 which as clearly shown in Figs. 13 and 14 are caused to rotate by intermeshing pinions 132, on said respective shafts, so that the sharpened teeth of said spur wheels engage a ticket and draw the same downwardly at the same time mutilating the same, the sharp teeth of the spur wheels cutting a number of continuous lines of perforations in the tickets. The mutilated ticket then falls into the compartment 133, within said collection box, and the same may be removed through the locked door 134. Guides or guards 135, slotted on their edges are bent upwardly beneath said spur wheels to disengage the tickets therefrom as the same issue from between the wheels.

In order to prevent reverse rotation of said mutilating wheels a small pawl 136 is pivoted in a position to engage one of the pinions 132, and is normally impelled into engagement therewith by means of a leaf spring 137. The tickets, as they are collected, are inserted through a long transverse slot 138, in the upper end of the collection box 6, the edges of said slot being of irregular shape to afford a plurality of teeth which act to resist a withdrawal movement of a ticket, but permit ready insertion thereof into the machine.

Figure 3:
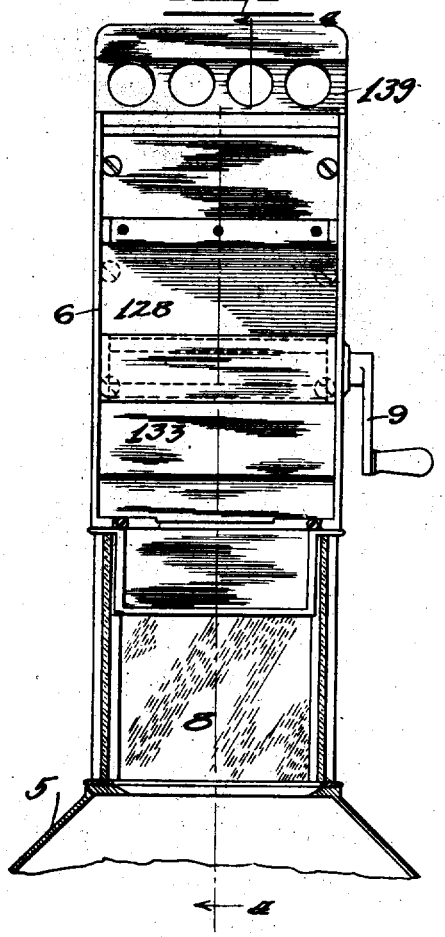
Fig. 3 is an enlarged detail view partly in section of the collection box for coins and tickets mounted on the fare register.
Figure 4:
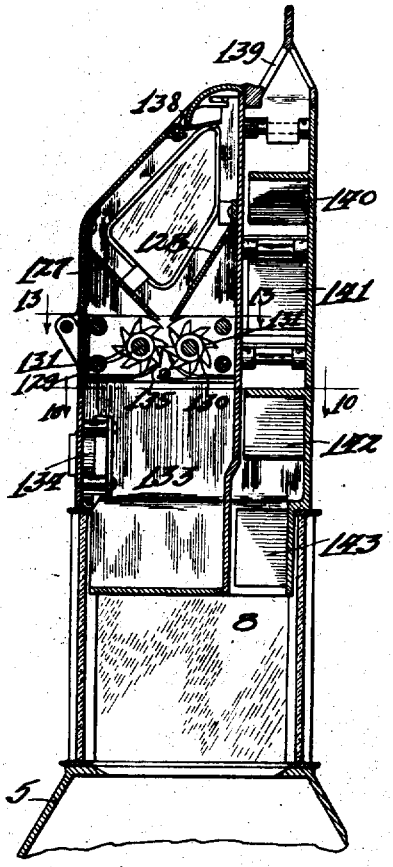
Fig. 4 is a section taken on line 4—4 of Fig. 3, with parts in elevation.
Figure 5:
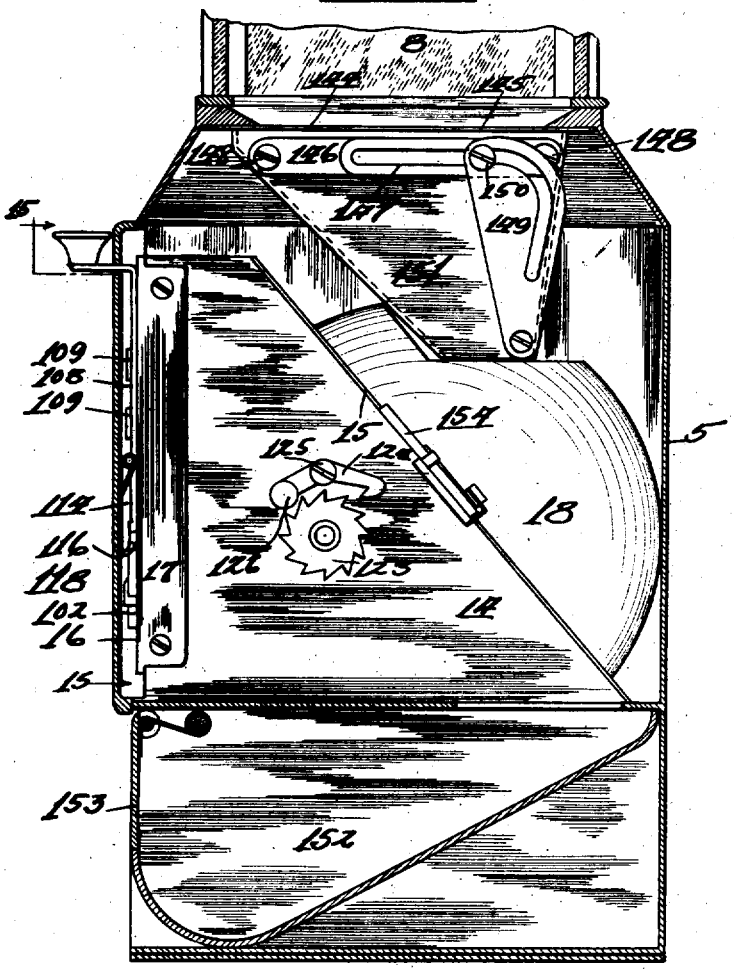
Fig. 5 is a detail view partly in section showing the interior of the fare box mechanism on one side thereof.
Figure 6:
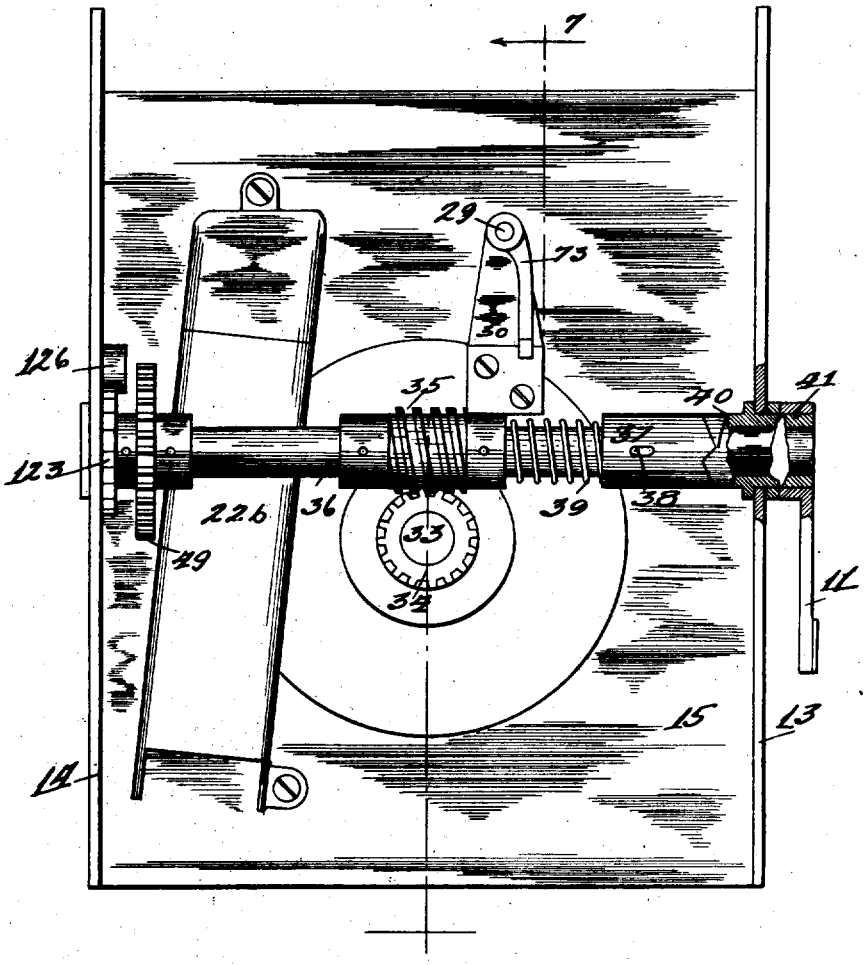
Fig. 6 is a detail rear elevation of the coin handling mechanism within the fare register.
Figure 7:
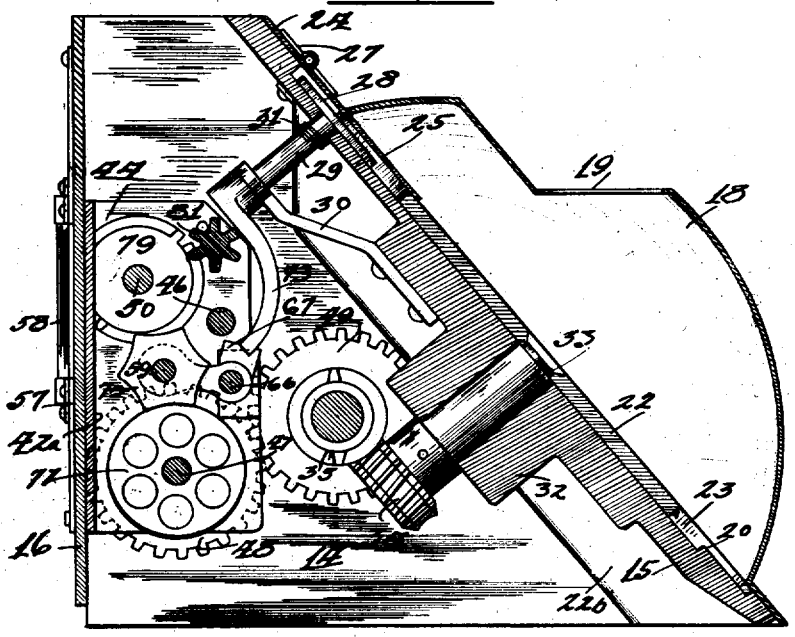
Fig. 7 is a section taken on line 7—7 of Fig. 6.

As clearly shown in Figs. 3 and 4 a pair of convergent plates 139 having a plurality of coin apertures therein, are mounted on the upper end of the collection box 6 and permit admission of the coins into a long compartment or passageway at the rear of the machine, which extends downwardly for the entire length of the collection box, and at its lower end opens into the inspection compartment 8. A plurality of baffle plates 140, 141, 142, and 143, are formed on the rear plate of the collection box, and project entirely across said coin passage compartment, so that a tortuous passage for a coin is provided after it is deposited through an aperture in the plates 139.

The coins which fall into the inspection compartment 8 are admitted into the coin hopper 18 in the following manner: The floor of said inspection compartment is formed of two dumping doors 144 and 145, hinged upon parallel horizontal shafts, the ends of each of which have slotted levers 146 and 147 respectively, secured thereon by means of screws 148. The lever 10 on the outside of the fare box casing 5 is secured upon a shaft, which on the interior of said fare box has a crank 149 rigidly secured thereon, said crank having a curved slot therein which engages a traveling pin 150, which is also engaged in the respective slotted levers 146 and 147. Consequently, when said lever 149 is swung downwardly the traveling pin 150 which is caused to move downwardly therewith swings the respective levers 146 and 147 downwardly thus dumping the doors 144 and 145, permitting a coin to fall therebetween and into the chute 151 which communicates with the aperture 19, in the upper portion of the coin hopper 18. The coins which have been counted by the coin mechanism already described and have been discharged into the chute 44, are emptied therefrom into a collection compartment 152, formed in the bottom of the fare register, access to which is gained by a normally spring closed door 153 which may be locked if so desired.

The operation is as follows:

The coin is deposited in the fare register through one of the apertures in either one of the plates 139 at the top of the collection box 6 and falls through a long compartment by a tortuous path, striking the respective baffle plates 140, 141, 142, and 143, into the inspection compartment 8 of the machine, and there resting upon the normally closed dumping doors 144 and 145 which form the floor of said inspection compartment. The crank 10 is then actuated, dumping the coin into the coin hopper 18 within the device, after which the crank 11 is turned, thus causing rotation of the coin wheel 22. The coins in the hopper are picked up one at a time, seating in the respective coin pockets 23 of the wheel and are elevated thereby toward counting position in their passage passing beneath a spring impelled lever 154, which acts to thrust the coin radially inwardly into the pocket to insure proper seating thereof.

Figure 9:
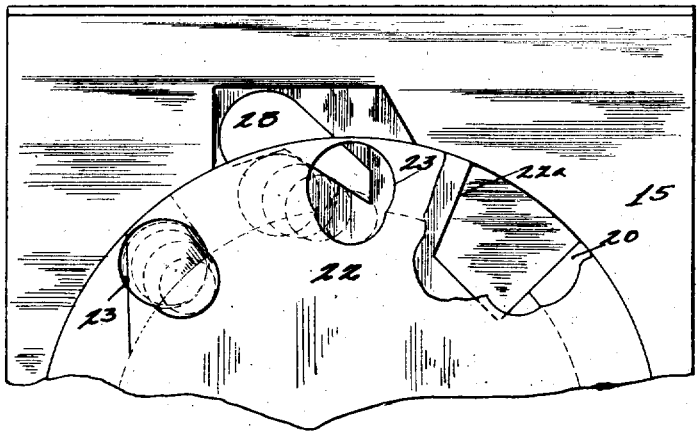
Fig. 9 is an enlarged detail view of the upper portion of the mechanism shown in Fig. 8, with the spring-impelled stripper element omitted.
Figure 11:
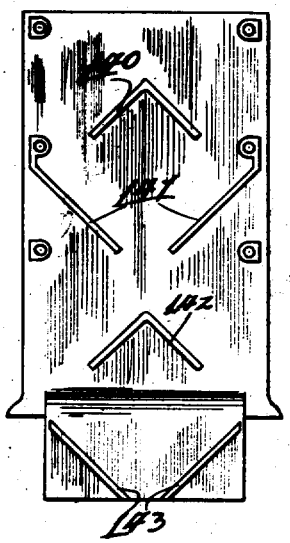
Fig. 11 is a face view of the rear plate of the coin collection casing taken on line 11—11 of Fig. 10.
Figure 10:
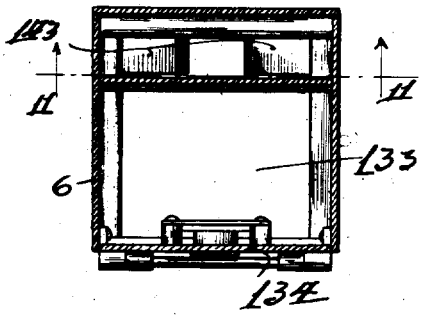
Fig. 10 is a section taken on line 10—10 of Fig. 4.
Figure 12:
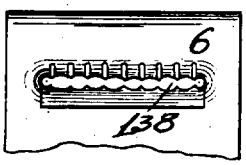
Fig. 12 is a fragmentary elevation showing the ticket slot in the collection box.

When the coins are first picked up in the pocket 23, the rib 20, formed on the stationary plate 15 beneath said coin wheel, and upon which said coin wheel tracks, prevents any of the coins seating in the pockets a depth greater than the thickness of the thinnest coin, so that the edge of each of the coins as they are carried upwardly projects beyond the surface of the coin carrying wheel, thus preventing more than one coin seating in one pocket of said wheel. However, just after the coins pass the position of the spring impelled lever 154 which acts to thrust the coins inwardly into the pockets to insure proper seating thereof, said rib 20 terminates as shown clearly in Fig. 28, so that the coin carrying pocket of the disk is considerably above the surface of the stationary plate 15 and the coins lie within the pockets at a depth such that the thickest coin which the machine may handle is below or flush with the upper surface of said disk, while the surface of thinner coins is of course below that of the disk. The thin lever 28 which is mounted between the disk 22, and said base plate 15 tracks over the periphery or edge of the coins as the same are swept by, and, as clearly shown in dotted lines in Fig. 9, the different positions of the various coins which the machine is capable of handling act to cause elevation of said lever different amounts and at different times. That is, the smallest coin raises the lever 28 the least amount and contacts the same at a period later than that of the largest coin. The movement of the lever 28 is transmitted to the coin registering mechanism through the shaft 29 extending through said plate 15 and the lever 73 which acts to shift the register wheels into train with the driving mechanism therefor, which is driven from the main shaft 36 of the device.

Said lever 73 bears upon the contact piece 67 on the slidable rod 66 shifting said rod to one side and said rod acts to shift the slidable shaft 59 therewith due to the connection of the tail piece 68 between the said rod and shaft. Accordingly, the small pinion 64 which is rigidly secured upon the shaft 59 is moved into a position to engage one of the rows of teeth on the mutilated gear 65 to be driven thereby, and the amplitude of the shifting movement of the small pinion 64 is determined entirely by the amplitude of movement of the lever 28 which is moved by the coin, so that each coin automatically causes entrainment of the proper gears for its own registration. The cam 74 which is provided to maintain the small pinion 64 in engagement with the respective driving teeth of the mutilated gear 65 is so constructed that the entrance to the respective grooves therein, one groove for each denomination of coin, are timed for synchronous rotation with the disk 22, so that whenever said lever 28 is elevated, inasmuch as different coins elevate said lever at different times with respect to the rotation of one coin pocket therepast, the proper cam groove in said member 74 is in position to be engaged by the finger 75 to retain said pinion 64 in engagement with the proper teeth on the mutilated gear the requisite time to effect full registration thereof, and immediately thereafter forcing the same back into initial position with the aid of the spring 72.

Of course, when the gear is in initial position, that is to one side of said mutilated gear 65, the star wheel 70 bearing upon the surface of the cylinder 77 prevents rotation of the shaft 59 and said gear 64, so that the register wheels cannot be actuated, inasmuch as they are entrained with a gear on said shaft 59. Whenever said shaft 59 is shifted to one side, the star wheel 70 is moved to a point whereby the teeth of said star wheel are permitted to rotate through a cut-away portion of the rotating cylinder 77 and after the proper number of degrees of rotation have taken place to effect a registration of the coin, the star wheel moves into contact with the walls of the cylinder, and can rotate no farther. Not only are the respective register wheels actuated to count the value of the coins, but also each fare collected, that is, if the machine is set for every five cents collected, such amounts are registered singly in the passenger register 4 and this takes place through the driving mechanism forming a part of the coin counting or registering means.

Said slidable shaft 59, on which the pinion 64 is secured, drives the gear 78, and the mutilated gear 79, at all times, and the elongated gear 81, normally meshes with said mutilated gear 79, so that twice during each rotation thereof said gear 81 is driven two teeth. This drive is transmitted to the gear 83, which is rigidly connected to the bevel pinion 84, and the bevel pinon 84 drives the bevel pinion 85 which is connected to the register shaft leading to the passenger register 4.

When a ticket or transfer is deposited into the machine through the slot 138, in the collection box 6, it falls into the inspection compartment 7, where after being viewed by the operator the crank 9 is actuated, thus driving the mutilating gears 131, which draw the ticket from the compartment and perforate the same, the ticket passing outwardly between the stripper or guard member 135, into the ticket collection compartment 133.

In order to effect registration of the ticket in the passenger register 4, the operator merely depresses the lever 12, immediately releasing the same. Referring to Fig. 15, this causes the lever 102, due to the movement of the bell crank having the arms 116 and 117, to move by the pawl 114, secured on the slide bar 108, which is a part of the lever 12, to be moved slightly to one side, the spring actuated pawl 119, holding the same in this slightly shifted position. When the main drive shaft 36 is actuated of course the drive being communicated to the shaft 47 of the counting mechanism, the cam 100 on said shaft 47 strikes the tooth 104 on said lever 102 shifting the same farther along so that the extension 105 of said lever 102 throws the pivoted lever 96 into an extreme position thereby shifting the elongated gear members 81 and 91 so that the gear 91 meshes with the multilated gear 93 and notched disk 94 and the gear 81, which is integrally connected with said gear 91 is of course in mesh at all times with the gear 83. Consequently the drive from the shaft 47 of the counting mechanism, being transmitted through the gears 99, 98, and 92, to said gear 91, causes the same to drive the gear 83 and consequently the bevel pinions which cause rotation of the passenger register shaft 89. Immediately this movement has taken place the depending pin 106 on the under side of said lever 96 being in the path of the cam 101, on the shaft 47, is contacted by the cam, and said lever 96 is returned to normal position. This movement of course is also transmitted to the extension 105 of the lever 102 so that said lever 102 is also returned to normal position. The teeth of the mutilated gear 93 and disk 94 which drive the small elongated gear 91 are so disposed and timed with respect to the cam 74 on the shaft 47 that they intermesh with said gear 91, to drive the same only at such time as the finger 75 is incapable of moving into engagement with any of the cam grooves on said members 74 and this position is that between the entrance and exit ends of said groove on said cam. It is obvious, therefore, that by no chance can both mechanisms be entrained with the fare register mechanism at the same time.

Due to the arrangement of the bell cranks 120 and 121 on the back of the plate 16 the bell crank 120 contacting the lever 102 and the bell crank 121 contacting the extension 122 on the slide bar 108 of the actuating lever 12, it is obvious that said lever 102 cannot be shifted except when the lever 12 is moved downwardly inasmuch as the bell cranks due to their position, lock said lever from movement, owing to the fact that the extension 122, is directly in the path of movement of one of the cranks.

The total sum of the fares collected may be readily observed from the exterior of the device through a small window provided for the purpose through which the numbers on the register wheels are visible, and likewise the total number of fares collected is indicated in the passenger register 4. The machine is protected from breakage, due to the jamming of coins by the spring clutch mechanism, connected to the actuating handle 11, and the main drive shaft 36, which, under excessive strain serves to disengage itself by compression of the spring 37. Similarly, the ratchet wheel 123, and pawl 124, act to lock the machine from movement when it is speeded up beyond a certain limit in an attempt to defraud the machine, at this time the weighted end of the pawl 126, being thrown outwardly, causing the pawl to engage the ratchet wheel.

I am aware that various details of construction may be varied through a wide range without departing from the principles of this invention, and I therefore do not purpose limiting the patent granted otherwise than necessitated by the prior art.

Claims—

1. In a machine of the class described a register, a mechanism for operating the same set in initial motion by contact of coins, a carrying element for coins having pockets therein and means permitting the coins dropping deeper into the pockets prior to the coins contacting a part of the operating mechanism.

2. In a device of the class described a rotatable coin advancing element having coin pockets therein, and a stationary element co-acting with the advancing element to hold the coins elevated to project above the pockets for a distance and adapted to permit the coins seating lower in the pockets.

3. In a device of the class described, a register, a mechanism normally inoperative for differentially actuating the register, a lever for initially shifting the mechanism into operative position, a coin carrying element having pockets therein, means coöperating with the coin carrying element whereby the coins are depressed into the pockets prior to contacting said lever and a mechanism for automatically continuing the shifting of the mechanism into full operative position.

4. In a device of the class described, a coin carrying element provided with coin seats, and means adapting the coins seating lower in the element as it advances.

5. In a device of the class described, a rotatable coin advancing wheel having coin seats thereon and a member co-acting with said wheel projecting the coins above the top edge of the seats for a part of the revolution of the wheel and permitting the coins dropping below the top edge of the seats to increase the effectiveness of the coin as a mechanical element.

6. In a device of the class described, a coin carrying wheel having a plurality of coin pockets or seats, and means coöperating therewith projecting the coins above the face of the carrying wheel for part of the rotation of the carrying wheel and means permitting the coins dropping deeper into the pockets of the carrying wheel.

7. In a device of the class described, a rotatable coin advancing wheel having coin seats thereon and a member co-acting with said wheel projecting the coins above the top edge of the seats for a part of the revolution of the wheel and permitting the coins dropping below the top edge of the seats to increase the effectiveness of the coin as a mechanical element, mechanism for stripping a super-imposed coin from a coin properly seated and a mechanism for ejecting any improperly carried coin.

8. In a device of the class described, a coin carrying wheel having a plurality of coin pockets or seats, means coöperating therewith projecting the coins above the face of the carrying wheel for part of the rotation of the carrying wheel said means permitting the coins dropping deeper into the pockets of the carrying wheel, a pivoted spring pressed stripper member for stripping outer coin off of a properly seated coin and mechanism for elevating the stripper member to permit such extra coin falling back upon the carrying wheel.

9. In a device of the class described, a coin carrying element adapted to carry coins at different depths therein as it advances.

10. In a device of the class described, a coin carrying element having pockets therein in which the depth of the coins seated therein is increased as the carrying element advances.

11. In a device of the class described, a coin carrying element having pockets therein in which the depth of the coins seated therein is increased as the carrying element advances, a lever operated by contact of the coins when the coins are seated at their maximum depth in the pockets and a coin registering mechanism operated for each actuation of the lever.

12. In a machine of the class specified, a rotatable coin carrying element and means seating the coins more firmly in the element at a position in the rotation thereof.

13. In a machine of the class specified, a rotatable coin carrying element, means seating the coins more firmly in the element at a position in the rotation thereof and pivoted mechanism for ejecting excess coins back onto the carrying element.

14. In a device of the class described, coacting, rotating and stationary mechanism for advancing coins and varying the depth therein at which the coins are carried.

15. In a machine of the class specified, a rotatable coin carrying element, and means for increasing the grip of the carrying element on the coin carried thereby.

16. In a machine of the class specified a rotatable coin carrying element, and means for increasing the grip of the carrying element on the coin carried thereby, prior to its reaching registering position.

17. In a device of the class described a coin carrying wheel provided with coin pockets each of which is adapted to receive a coin therein, and means for increasing the mechanical contact between the coins and carrying wheels.

18. In a device of the class described a coin carrying element, and means for increasing the effectiveness of the carrying element to act on the coins as a mechanical element.

19. In a device of the class described a coin carrying element adapted to carry coins with one surface above the surface of the carrying element whereby a superposed coin may be removed and said carrying element adapted to carry the coin with the surfaces of the coin below the surface of the carrying element as the coin reaches registering position.

20. In a device of the class described a coin carrying member, and means for increasing the effectiveness of the engagement between the coin carrying member and coin prior to the coin being swept past registering position.

21. In a machine of the class described a rotatable coin-carrying element having coin-carrying pockets and means for preventing the coins from seating in the pockets a depth greater than the thickness of the thinnest coin for a part of the rotation of the carrying element and permitting the coins to seat in the pockets a depth so that the thickest coins are flush with or lower than the upper surface of the carrying element.

22. In a machine of the class described, means transferring coins to a counting position, a register, mechanisms connected to operate the same adapted to be set in operation by a coin as a mechanical element, and means over which the coins are moved by said transferring means tapered at one portion to co-act with said transferring means to increase the degree of relative engagement of said transferring means with said coins to increase the effectiveness thereof as a mechanical element.

23. In a machine of the class described, a stationary element, means movable thereover to transfer coins therealong, a register, a pair of levers on said stationary element for operating the register adapted to be set in operation by a coin moved by said means, and said stationary element provided with an inclined surface over which the coin moves transferred by said means to increase the degree of engagement of the coin with said means for proper actuation of said levers.

24. In a machine of the class described, a stationary element, means movable thereover to transfer coins therealong, register mechanisms adapted to be set in operation by a coin as a mechanical element moved by said means, and a rib integral with said stationary element having one portion tapered off flush with said stationary element over which the coin travels for actuation of said mechanisms whereby the degree of engagement of the coin with said means is changed.

25. In a machine of the class described for counting coins of different denominations, stationary means along which the coins are moved toward a counting position, mechanism for moving the coins, and means on said stationary means tapered at one portion so as to increase the degree of engagement of a coin with said moving mechanism.

26. In a coin counting machine of the class described for counting coils of different denominations embracing mechanism for engaging a coin to carry the same toward counting position and utilize the same as a mechanical element, and tapered means for increasing the degree of engagement of the coins with said mechanism as the coins move into counting position.

27. In a coin counting machine of the class described, a stationary element, coin transferring means interfitting therewith and adapted to move coins thereover toward a counting position, and an inclined portion on said stationary element which causes a coin to increase its degree of engagement with said transferring means as the coin moves into counting position.

28. In a device of the class described, a stationary plate, coin transferring means movably mounted thereon, a rib integrally formed on said plate having a portion thereof inclined to change the degree of engagement of coins with said coin transferring means as the coins move over said rib into counting position, a register, selective means connected therewith, connected levers pivotally mounted on said plate adapted to be actuated by coins carried on said coin transferring means to engage said selective means to actuate the register, and finger means pivotally mounted on said plate and projecting therethrough to strike off coins improperly carried by said coin transferring means.

29. In a machine of the class described, a rotatable coin-carrying element having pockets therein adapted to seat coins at a minimum and maximum depth, a lever contacted by the coins when seated at the maximum depth in the wheel, a register, a mechanism normally out of mesh for actuating the register, a second lever connected with and initially moved by the aforesaid lever for starting the adjustment of the mechanism into mesh, and a cam element for continuing the movement of the second-named lever for completing the adjustment of the mechanism into mesh.

30. In a machine of the class described, a rotatable coin-carrying element having pockets therein adapted to seat coins at a minimum and maximum depth, a lever contacted by the coins when seated at the maximum depth in the wheel, a register, a mechanism normally out of mesh for actuating the register, a second lever connected with and initially moved by the aforesaid lever for starting the adjustment of the mechanism into mesh, and a cam element for continuing the movement of the second-named lever for completing the adjustment of the mechanism into mesh and holding the mechanism in mesh until the register registers the value of the coin and then positively returning both levers to normal position.

31. In a device of the class described, the combination of a rotating coin-carrying disk having a coin-receiving pocket, a register, the operation of which is controlled by a coin traveling in the pocket, and means for increasing the capacity of the pocket as it approaches the register controlling position, so as to more securely hold the coin in the pocket.

In testimony whereof, I have hereunto subscribed my name in the presence of a subscribing witness.

JAY M. JOHNSON.

Witness:
LAWRENCE REIBSTEIN.